United States Patent [19]
Halfmann

[11] Patent Number: 6,064,164
[45] Date of Patent: May 16, 2000

[54] BRUSHLESS D.C. MOTOR

[75] Inventor: Jürgen Halfmann, Herzogenrath, Germany

[73] Assignee: U.S. Philips Corporation, New York, N.Y.

[21] Appl. No.: 09/338,151

[22] Filed: Jun. 23, 1999

[30] Foreign Application Priority Data

Jun. 24, 1998 [DE] Germany .............................. 198 28 046

[51] Int. Cl.⁷ ....................................................... H02P 6/00
[52] U.S. Cl. ............................................ 318/439; 318/254
[58] Field of Search .................................... 318/138, 254, 318/439, 720, 721, 723, 724

[56] References Cited

U.S. PATENT DOCUMENTS

| | | | |
|---|---|---|---|
| 3,908,130 | 9/1975 | Lafuze | 318/430 X |
| 4,246,518 | 1/1981 | Kogler et al. | 318/138 |
| 4,751,438 | 6/1988 | Markunas | 318/254 |
| 5,200,675 | 4/1993 | Woo | 318/254 |
| 5,583,404 | 12/1996 | Karwath et al. | 318/254 |

*Primary Examiner*—Bentsu Ro
*Attorney, Agent, or Firm*—Ernestine C. Bartlett; Leroy Eason

[57] ABSTRACT

The invention relates to a brushless d.c. motor having a commutation circuit for the commutation of phase currents in order to generate a given commutation angle in a given mode of operation of the d.c. motor. In order to guarantee a satisfactory performance of the motor for all modes of operation the commutation circuit is switched between a plurality of modes in which different commutation angles are generated with a switching frequency which is substantially higher than the operating frequency of the motor. The invention is particularly suitable for the use in brushless d.c. motors for domestic appliances such as food processors.

6 Claims, 2 Drawing Sheets

BRUSHLESS D.C. MOTOR

BACKGROUND OF THE INVENTION

The invention relates to a brushless d.c. motor having a commutation circuit for the commutation of phase currents in order to generate a given commutation angle in a given mode of operation of the d.c. motor.

Motors of this type are used, for example, in domestic appliances such as food processors.

From EP 0 762 625 A1 a brushless d.c. motor is known, wherein a smoothed d.c. supply voltage is applied to a commutation circuit comprising three half bridges with two switching elements each. The commutation circuit supplies phase voltages for the three phase windings of the motor stator, which are connected in star arrangement. A module comprising control and regulation elements supplies commutation signals to the commutation circuit, which signals define the switching states of the switching elements of the commutation circuit. For this purpose, the module processes sensor signals which correspond to the rotational position of the d.c. motor and which are supplied by position detectors. The position detectors are arranged in the proximity of the rotor and, for example, take the form of Hall sensors. The waveforms and the magnitudes of the phase voltages are adjusted by means of pulse width modulation (PWM). The pulse width modulation is realized by rapid switching-over of the switching elements of the commutation circuit, the frequency of the pulse width modulation being substantially higher than the commutation frequency.

Brushless d.c. motors in which, for example for reasons of cost, the commutation angle is not freely adjustable but in which only a limited number of commutation angles are available, have the problem that a satisfactory operation of the motor is not guaranteed for all operating conditions.

SUMMARY OF THE INVENTION

According to the invention the problem is solved in that switching of the commutation circuit between a plurality of modes in which different commutation angles are generated is effected with a switching frequency which is substantially higher than the operating frequency of the motor.

The rapid switch-over between the modes leads to a resultant commutation angle which lies between the commutation angles available without the rapid switch-over. The number of available commutation angles is thus increased without any essential changes to the basic construction of the d.c. motor being necessary. The resultant commutation angle is derived from the commutation angles which are also available without the use of the invention. It is merely necessary to provide a control circuit for the control/regulation of the rapid switch-over. The operating frequency of the motor is defined herein as the fundamental frequency of the phase currents.

Preferably, switching of the commutation circuit between a first mode, in which a first commutation angle is generated, and a second mode, in which a second commutation angle is generated, is effected with a switching frequency which is substantially higher than the operating frequency of the motor. When a resultant commutation angle is to be generated which is centered between two commutation angles which are also available without the invention, such a switch-over between only two commutation angles is adequate, even when the time intervals allotted to the first modes are equal to the time intervals allotted to the second modes.

In an embodiment of the invention there is provided a digital circuit for controlling the process of switching between the modes. Thus, controlling can be realized at low cost and in a simple manner. In particular, the mode switching frequency is derived from the frequency of a pulse width modulation used for controlling the variation in time of the magnitudes of the phase voltages. A control signal of the desired frequency corresponding to the mode switching frequency can easily be derived from the frequency of a pulse width modulation, which is regularly available anyway, by frequency division or frequency multiplication.

The invention can be used for adapting the commutation angle, particularly for braking of the d.c. motor.

The invention also relates to a digital circuit for switching the commutation circuit in the manner described above.

BRIEF DESCRIPTION OF THE DRAWINGS

An embodiment of the invention will be described in more detail, by way of example, with reference to the drawings. In the drawings.

DESCRIPTION OF THE PREFERRED EMBODIMENTS

Figure 1:
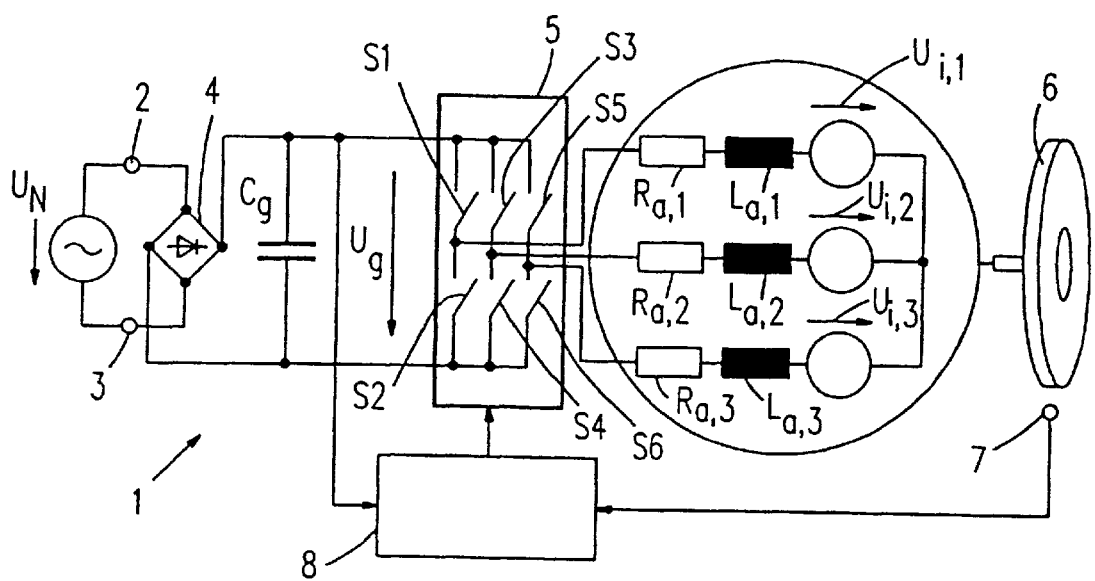
FIG. 1 shows the basic structure of a d.c. motor in accordance with the invention.

A mains voltage $U_N$, for example a voltage of 230 V and 50 Hz, is applied to two input terminals 2 and 3 of the brushless d.c. motor 1 shown in FIG. 1. The mains voltage $U_N$ is applied to a mains rectifier 4. The mains rectifier 4 supplies a d.c. supply voltage to a smoothing capacitor $C_g$, as a result of which a smoothed d.c. supply voltage $U_g$ appears across this capacitor. The voltage $U_g$ is applied to a commutation circuit 5, which comprises three half bridges having two switching elements each. The first half bridge comprises the switching elements S1 and S2, the second half bridge comprises the switching elements S3 and S4, and the third half bridge comprises the switching elements S5 and S6. The commutation circuit 5 supplies the required phase voltages to three phase windings of the motor stator, which phase windings are connected in star arrangement. The star arrangement of the phase windings is only an example of a motor version and is not essential for the present invention. The first phase winding has an effective resistance $R_{a,1}$ and an inductance $L_{a,1}$. In this winding a voltage $U_{i,1}$ is induced. The second phase winding has an effective resistance $R_{a,2}$ and an inductance $L_{a,2}$ and in this winding a voltage $U_{i,2}$ is induced. Finally, the third phase winding has an effective resistance $R_{a,3}$ and an inductance $L_{a,3}$. In this third phase winding a voltage $U_{i,3}$ is induced. The first phase winding is connected to a node between the switching elements S1 and S2, the second phase winding is connected to a node between the switching elements S3 and S4, and the third phase winding is connected to a node between the switching elements S5 and S6.

The d.c. motor 1 has a permanent-magnet rotor 6 whose rotational position is detected by means of three position detectors 7. FIG. 1 shows only one of the position detectors 7. In this particular case the position detectors take the form of Hall sensors. They supply position signals to a control circuit 8, which receives the voltage $U_g$ and which controls the switching states of the switching elements S1 to S6 of the commutation circuit 5. For details relating to the control by means of the commutation circuit 5 reference is made to, for example, EP 0 762 625 A1 already mentioned in the introductory part.

Figure 2:
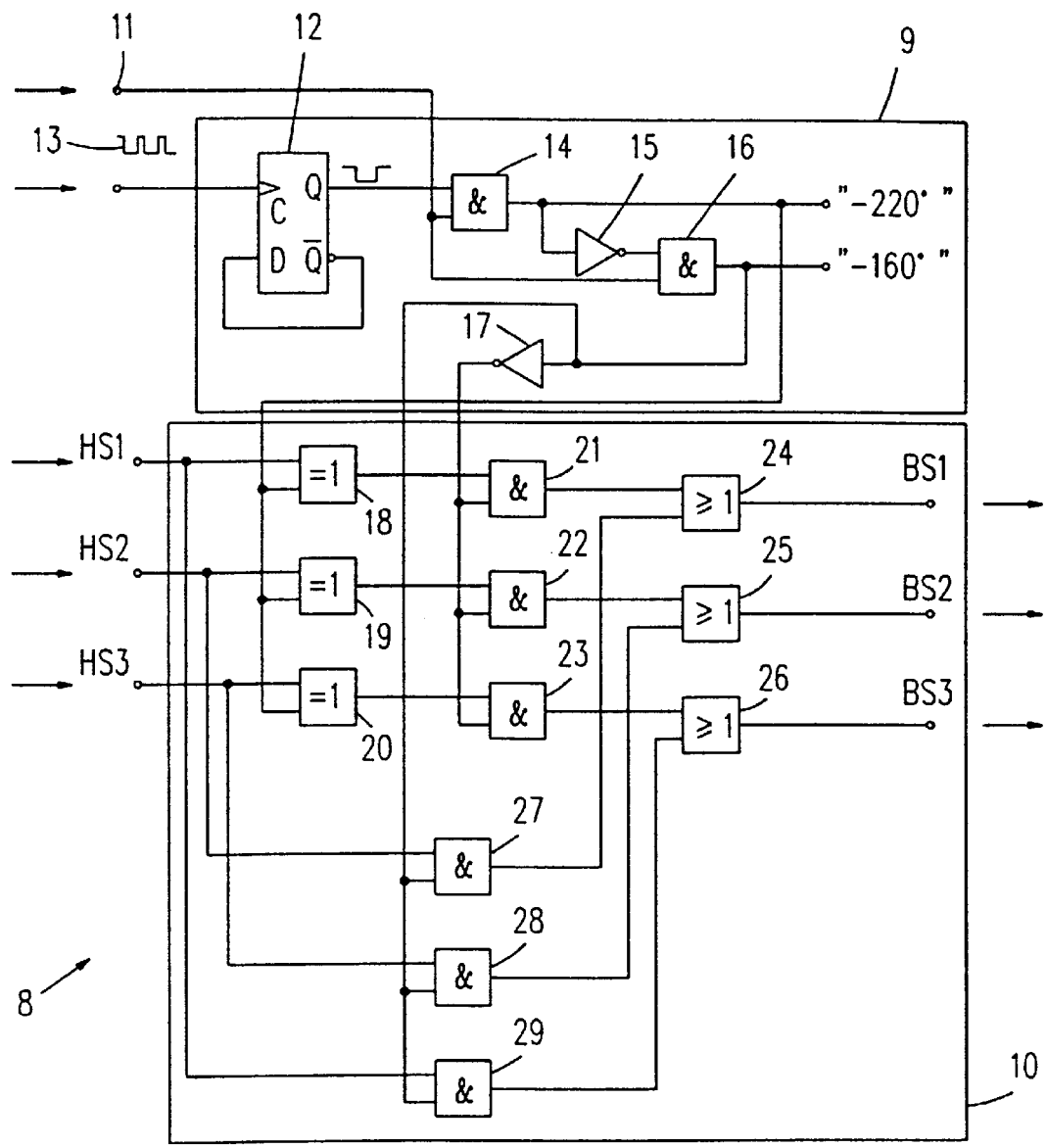
FIG. 2 shows a control circuit for controlling the commutation circuit of the d.c. motor.

FIG. 2 shows circuit details of the control unit 8 already mentioned with reference to FIG. 1. It includes a synchronizing unit 9 and a processing unit 10. The processing unit 10 receives and processes digital sensor signals HS1, HS2 and HS3 generated by the position detectors 7. At its three outputs three digital control signals BS1, BS2 and BS3 are available by means of which the switching states of the switching elements S1 to S6 of the commutation circuit 5 can be controlled. In normal operation of the d.c. motor 1, i.e. when the d.c. motor performs its function of driving an electrical appliance, the sensor signals HS1, FS2 and HS3 are transferred without change to the control outputs of the processing unit 10, where they are used as control signals BS1, BS2 and BS3. The position detectors 7 have been arranged in such a manner that in this operating condition a given advantageous commutation angle is obtained. In the present case, for example, a commutation angle of −40° is used for this operating condition. The synchronizing unit 9 acts upon the processing by the processing unit 10 in the braking mode of the d.c. motor. In this mode the synchronizing unit 9 receives a braking signal at its input 11, in the present case in the form of a digital "1". The synchronizing unit 9 sets a given advantageous commutation angle during a braking operation, in the present case a commutation angle of −190°.

The generation of the desired commutation angle for the braking mode is described in detail hereinafter. For this, use is made of the fact that in the present d.c. motor 1 the commutation angle can be changed only by changing the allocation of the sensor signals HS1, HS2 and HS3 to the control signals BS1, BS2 and BS3. The afore-mentioned commutation angle of −40° is set when the sensor signal HS1 is used as the control signal BS1, the sensor signal HS2 as the control signal BS2, and the sensor signal HS3 as the control signal BS3. By cyclically changing this allocation or the inversion of the sensor signals the prevailing commutation angle can be changed by the control unit 8. If the sensor signal HS2 is used as the control signal BS1, the sensor signal HS as the control signal BS2, and the sensor signal HS1 as the control signal BS3, a commutation angle of −160° is obtained owing to this cyclic change of the allocation of the control signals and sensor signals to one another. If the inverted sensor signal HS1 is used as the control signal BS1, the inverted sensor signal HS2 as the control signal BS2, and the inverted signal HS3 as the control signal BS3, a commutation angle of −220° is obtained owing to the resulting 180° phase shift.

The synchronizing unit 9 comprises an edge-triggered D flip-flop which operates as a frequency divider. A clock signal 13, which is also used for the pulse width modulation effected by the commutation device 5, is applied to a clock input C of said flip-flop. The pulse width modulation serves for shaping the waveforms of the phase voltages or phase currents of the d.c. motor 1. The pulse width modulation is also controlled by the control unit 8 by suitable modulation of the control signals applied to the switching elements S1 to S6. The digital signal at the Q output of the flip-flop 12 is derived from the pulse width modulation signal 13 through frequency division by the factor 2 and consequently has the same clock frequency. It is applied to an AND gate 14 having its second input connected to the terminal 11 and which receives a digital braking signal at this second input. In the braking mode of the d.c. motor 1 a digital "1" is applied to the terminal 11 and otherwise a digital "0". The output of the AND gate 14 is connected to the input of a NAND circuit 15, whose output is connected to the input of an AND circuit 16. The second input of the AND circuit 16 is connected to the terminal 11 which is arranged to receive a braking signal. The synchronizing unit 9 further comprises a NOT circuit whose input receives the output signal of the AND circuit 16.

The processing unit 10 includes EXOR circuits 18, 19 and 20, which each have an input to which the output signal of the AND circuit 14 is applied. The sensor signal HS1 is applied to the second input of the EXOR circuit 18, the sensor signal HS2 is applied to the second input of the EXOR circuit 19, and the sensor signal HS3 is applied to the second input of the EXOR circuit 20. The processing unit 10 includes three AND circuits 21, 22 and 23, which each have an input to which the output signal of the NOT circuit 17 is applied. The AND circuit 21 has its other input connected to the output of the EXOR circuit 18. The AND circuit 22 has its other input connected to the output of the EXOR circuit 19 and the AND circuit has its other input connected to the output of the EXOR circuit 20.

The processing unit 10 further includes three OR circuits 24, 25 and 26. The OR circuit 24 has an input connected to the output of the AND circuit 21. The OR circuit 24 has its other input connected to the output of an AND circuit 27 having one input to which the sensor signal HS2 is applied and having another input to which the output signal of the AND circuit 16 is applied. The first input of the OR circuit 25 is connected to the output of the AND circuit 22 and the second input of the OR circuit 25 is connected to the output of an AND circuit 28 having one input to which the sensor signal HS3 is applied and having another input to which the output signal of the AND circuit 16 is applied. The output signal of the AND circuit 23 is applied to the first input of the OR circuit 26 and the output signal of an AND circuit 29 is applied to the second input of this OR circuit. The sensor signal HS1 is applied to one input of the AND circuit 29 and the output signal of the AND circuit 16 is applied to the other input of the AND circuit 29. The OR circuit 24 supplies the control signal BS1 at its output, the OR circuit 25 supplies the control signal BS2 at its output, and the OR circuit 26 supplies the control signal BS3 at its output.

In the case that in the braking mode of the d.c. motor 1 a digital "1" appears on the Q output of the flip-flop 12, a digital "1" will also appear on the output of the AND circuit 14. At the same time the AND circuit 16 produces a digital "0" on its output. In this case the inverted sensor signal HS1 is applied to the commutation circuit 5 as the control signal BS1, the inverted sensor signal HS2 is applied as the control signal BS2, and the inverted sensor signal HS3 is applied as the control signal BS3. This corresponds to a commutation angle of 120°.

In the case that a digital "0" appears on the Q output of thew flip-flop 12 in the braking mode of the d.c. motor 1, a digital "1" will appear on the output of the AND circuit 16 and a digital "0" on the output of the AND circuit 14. As a result of this, the sensor signal HS2 is supplies as the control signal BS1, the sensor signal HS3 as the control signal BS2 and the sensor signal HS as the control signal BS3. This corresponds to a commutation angle of −160°.

Switching between the mode in which a commutation angle of −220° is set and the mode in which a commutation angle of −160° is set is effected with an appropriate frequency of the signal which appears on the Q output of the flip-flop 12. This switching frequency is substantially higher than the operating frequency of the motor 1. The motor operating frequency corresponds to the frequency of the fundamental wave of the phase voltages or phase currents. The frequency of the phase voltages or phase currents lies, for example, in the range from 10 Hz to 1 kHz and in the present case the frequency of switching between the modes with the commutation angles of −220° and −160° lies between 5 kHz and 10 kHz. As a result of the switching between the two modes with the same duty cycle at a rate which is fast with respect to the motor operating frequency, a resultant commutation angle of −190° is obtained in the example described here.

Since the synchronizing unit 9 and the processing unit 10 take the form of digital circuits and, moreover, the process of switching between the modes with commutation angles of −220° and −160° is controlled by means of a digital circuit a particularly simple implementation of the invention is achieved. The invention is not limited to the use for the braking mode of the d.c. motor 1. It can be used as desired for any mode of operation of the d.c. motor with a given commutation angle. The invention is not limited to switching between two modes and, consequently, between two commutation angles. The disclosed approach may readily be extended to switching over between more than two modes and, consequently, more than two commutation angles in order to obtain other resultant commutation angles. A further variant to be mentioned here is that switching between the various modes is not effected uniformly but that time intervals of different lengths and, consequently, different duty cycles are used for the various modes in order to extend the range of resultant commutation angles that can be generated.

I claim:

1. A brushless d.c. motor having a commutation circuit for the commutation of phase currents in order to generate a given commutation angle in a given mode of operation of the d.c. motor wherein, switching of the commutation circuit between a plurality of modes in which different commutation angles are generated is effected with a switching frequency which is substantially higher than the operating frequency of the motor.

2. A d.c. motor as claimed in claim 1, wherein switching of the commutation circuit between a first mode, in which a first commutation angle is generated, and a second mode, in which a second commutation angle is generated, is effected with a switching frequency which is substantially higher than the operating frequency of the motor.

3. A d.c. motor as claimed in claim 1, wherein there has been provided a digital circuit for controlling the process of switching between the modes.

4. A d.c. motor as claimed in claim 3, wherein by means of the digital circuit the mode switching frequency is derived from the frequency of a pulse width modulation used for controlling the variation in time of the magnitudes of the phase voltages.

5. A d.c. motor as claimed in claim 3, wherein switching between the modes is effected in order to generate a given commutation angle in the braking mode of the d.c. motor.

6. A digital circuit for controlling the switching process of the commutation circuit of a d.c. motor as claimed in claim 1.

* * * * *